Oct. 4, 1949.   F. E. NIEDERHISER   2,483,662
MACHINE TOOL ADAPTER

Filed March 30, 1946                       2 Sheets-Sheet 1

INVENTOR.
Floyd E. Niederhiser
BY
Staudling and Krost
attys.

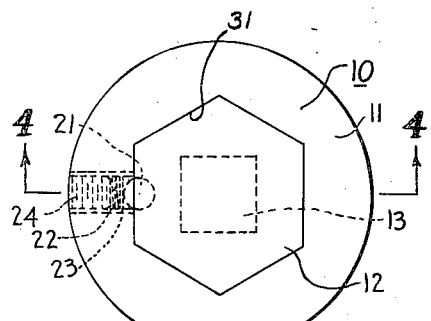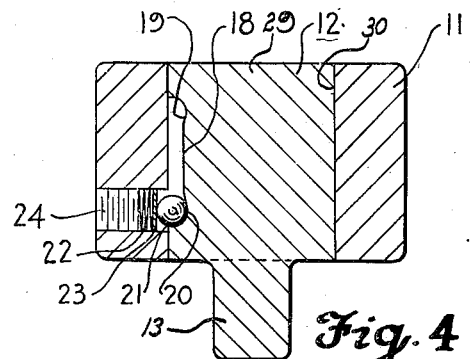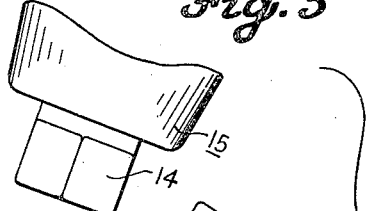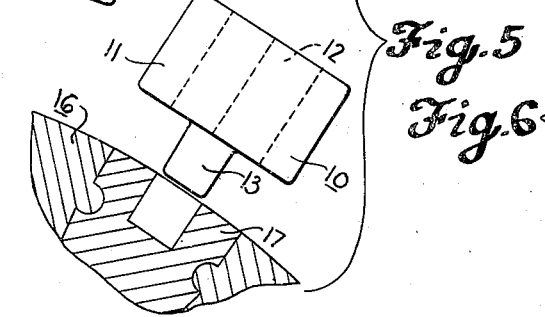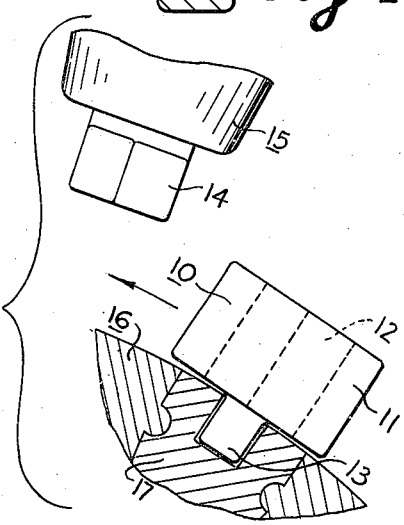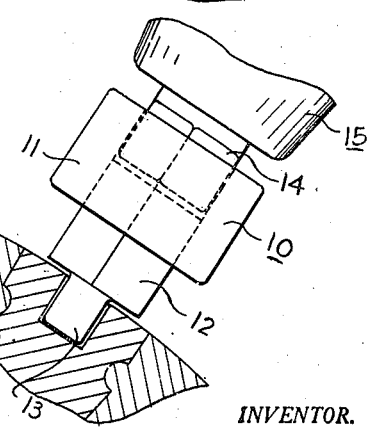

Patented Oct. 4, 1949

2,483,662

UNITED STATES PATENT OFFICE 2,483,662

MACHINE-TOOL ADAPTER

Floyd E. Niederhiser, Cleveland, Ohio

Application March 30, 1946, Serial No. 658,477

2 Claims. (Cl. 279—1)

1

My invention relates in general to machine tools, and more particularly to a power driven adapter for a wrench mechanism to operate a lathe chuck.

An object of my invention is to provide an adapter to transmit power from a driving power wrench to a chuck jaw adjusting member.

Another object of my invention is to provide a telescoping adapter insertable between a driven member and a driver member and extendable to engage the members and transmit power therebetween.

Other objects and a fuller understanding of my invention may be had by referring to the following description and claims, taken in conjunction with the accompanying drawing, in which:

Figure 3 is a top plan view of a preferred embodiment of my improved adapter;

Figure 4 is a cross-sectional view through the line 4—4 of Figure 3;

Figure 5 is a diagrammatic view of a power driven shaft and my improved adapter in position to be inserted into a chuck jaw adjusting socket;

Figure 6 is a diagrammatic view similar to the Figure 5 with my improved adapter engaged with the chuck jaw adjusting socket;

Figure 7 is a diagrammatic view of my improved adapter engaged in the chuck jaw adjusting socket, and with the adapter and chuck rotated to a position co-axial with the longitudinal axis of the power driven shaft; and Figure 8 is a diagrammatic view illustrating the final steps in bringing my improved adapter into position to transmit power between the power driven shaft and the chuck adjusting socket.

My improved adapter is provided for the purpose of transmitting power between a power driven wrench shaft, and the jaw adjusting member of a lathe chuck. It is well known, among those familiar with machine shop practice, that hand tightening of lathe chucks is the cause of the drag in production that comes as arms and bodies get weary from tugging at heavy wrenches. And the bigger the piece, the longer it takes and the earlier the fatigue drag

2 sets in. My improved device for operating the lathe chuck has cut the time required for chucking in both the chucking and removing operations, and amounts, on some types of work, to as much as 75 per cent saving over the hand method of chucking. My improved chucking method comprises a motor driven wrench, and an adapter designed to fit the jaw adjusting member of the particular chuck being used, and engage the power driven wrench. This convenient device is readily put in place for operation to tighten or loosen the jaws. Also, the right hand is always free to insert or remove the work piece from between the clamping jaws. The entire operation requires but a fraction of the time needed for the same work with a hand wrench. Although the entire description of my device will be directed toward a lathe chuck, this is only one possible use out of many, and is understood to be only an illustration embodying the basic principle of the invention. Other uses to which this device has been put include operation with thread millers, pipe threading machines, boring mills, screw machines and vices. Many types of bench work and bolt tightening can also be accomplished with less labor and fatigue through the application of my invention.

Figure 1:
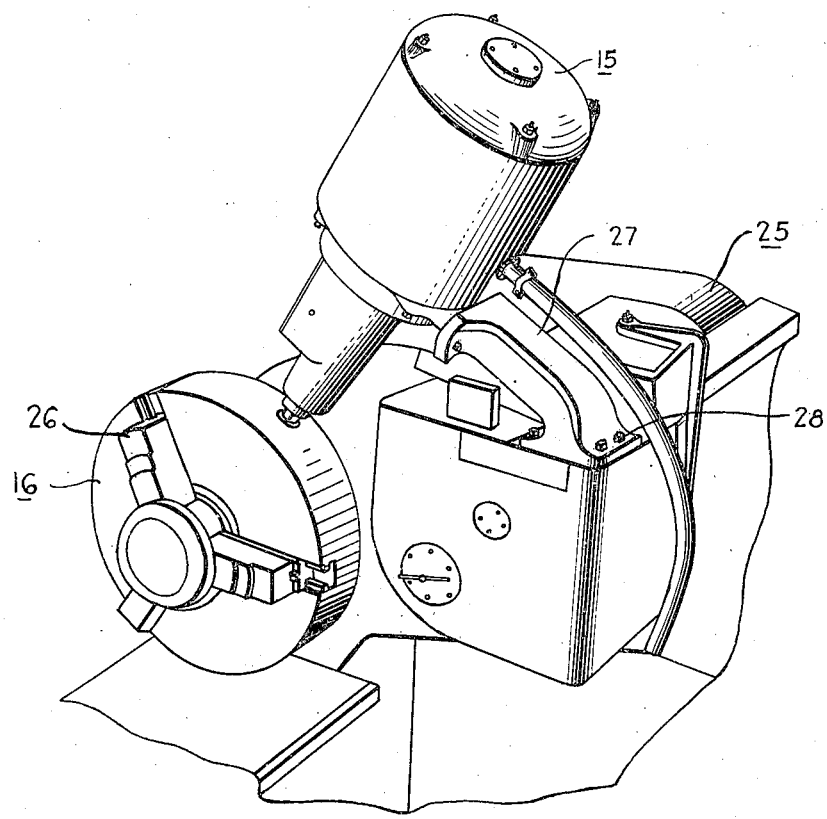
Figure 1 is a perspective view of a lathe and a universal chuck with which my improved power wrench and adapter may be employed.

In the drawing, I illustrate an embodiment of my invention as employed with a lathe. In Figure 1 of the drawings, the lathe is represented by the reference character 25, and is equipped with a well-known type of chuck 16 having work engaging jaws 26. These jaws are operated by a mechanism within the chuck 16 and the mechanism in turn is actuated by an adjusting socket member 17. In this particular type of lathe chuck, all of the jaws 26 are operated simultaneously by moving one socket member 17. Usually, there are at least three such socket members 17 around the peripheral surface of the chuck 16, in order that the jaws might be operated without revolving the chuck 16 a very great distance to reach the socket members 17.

Figure 2:
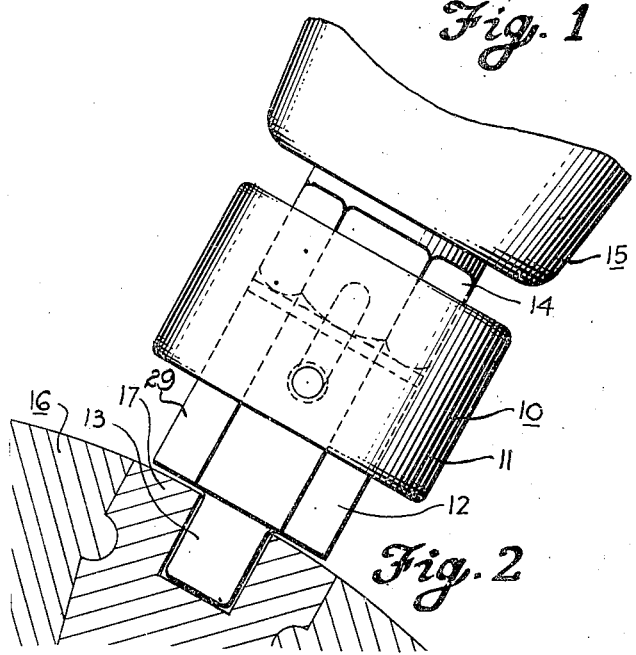
Figure 2 is a greatly enlarged view illustrating my improved adapter in place to transmit power from a power wrench to a socket type chuck adjusting member.

In the Figure 1, I illustrate an electrically operated power wrench 15 secured to the lathe 25 by a bracket arm 27 and bolts 28. The power driven wrench 15 is preferably mounted in relation to the chuck 16 with the longitudinal axis of rotation of the wrench directed substantially toward the center of rotation of the chuck 16. That is, the longitudinal axis about which the shaft 14 of the wrench 15 rotates, is extended toward the center of rotation of the chuck 16, and substantially coincides with the radius of the chuck 16. Also, in this particular adaptation of the power wrench 15, the shaft 14 is positioned close to the peripheral surface of the chuck 16, but with a clearance space therebetween sufficient to allow free turning of chuck 16 during lathe operation. In the Figures 3 and 4, I illustrate my improved adapter used to transmit power from the power wrench shaft 14 to the adjusting socket member 17. This embodiment of my invention comprises a core 12 and a sleeve 11. The core 12 is provided at one end thereof with a plug 13 to fit into the adjusting socket 17 of the chuck 16. The sleeve 11 is adapted to slide upon the core 12 in a telescoping manner in order to extend the adapter 10 to engage the respective driver and driven parts. A ball race 18 is provided in the core 12, and has two enlarged ends 19 and 20 therein to serve as end stations for a ball 21. A runner 23 and a spring 22 are adjustably held against the ball 21 by a set screw 24 to control the tension of the ball 21 in the ball race 18. Thus, the sleeve 11 may be telescoped upon the core 12, as illustrated in the Figure 4, or the sleeve 11 may be extended to engage the shaft 14, as illustrated in the Figure 2. By the provision of my improved adapter 10, I am able to provide a power wrench which is so simple in construction and operation, that the power wrench may be readily adapted to almost any machine without the necessity of expensive alteration or redesigning the machine to employ the power wrench. There are no complicated moving parts requiring expensive upkeep, and the operation is so extremely simple that the most inexperienced worker can operate the wrench with ease.

In the illustrated embodiment of my device, I have shown the core member 12 with a plug 13 thereon of smaller dimension than the remaining portion of the core. Thus, the adapter 10 and the shaft 14 are strengthened because of the increased dimensions. That is, I have provided a shaft 14 of larger size than the socket member 17, and accordingly have provided the core 12 with a body portion 29 having a cross-sectional configuration substantially duplicating that of the shaft 14. Thus, the opening 30 of the sleeve 11 will fit closely about the shaft 14 when the adapter 10 is extended by moving the sleeve 11 to engage the shaft 14. The plug 13 on the end of the core 12 is relatively short in comparison to the over-all length of the adapter 10, and therefore will withstand a considerably greater amount of torque stress than a piece of similar cross-sectional dimension and longer length.

With this improved adapter, the top surface of the body portion 29 of the core 12 and the surfaces of the opening 30 in the sleeve 11, will form a shaft engaging socket when the sleeve is moved longitudinally with respect to the core 12 to engage the shaft 14. Thus, the adapter 10 will provide a convenient power wrench engaging portion, as well as an engaging portion for the chuck jaw adjusting member. It is understood, of course, that the engaging portions described could be readily provided in other convenient forms to engage either projecting or recessed driving and driver members as desired.

In the Figures 5 to 8, I illustrate diagrammatically the mode of operation of my improved adapter in transmitting power from the wrench shaft 14 to the adjusting socket 17. In Figure 5, the adapter plug 13 is in position to enter into the adapter socket 17. The sleeve 11 is telescoped upon the core 12 with the ball 21 resting in the end station 20 of the ball race 18.

In the Figure 6, the adapter 10 has been positioned with the plug 13 in the adapter 17, and the chuck 16 with the adapter 10 positioned thereon is moved in the direction of the arrow to position the adapter 10 in alignment with the shaft 14.

In the Figure 7, the chuck 16 and the adapter 10 have been moved into a position of alignment with the shaft 14. The sleeve 11 is then extended to engage the shaft 14, as illustrated in the Figure 8. When the sleeve 11 is extended and brought into driving engagement with the shaft 14, the sleeve 11 and the core 12 remain overlapped over a considerable portion of their length, in order that driving torque may be transmitted from the shaft 14 to the sleeve 11 and transmitted thereby to the core 12. The core 12 then in turn transmits the driving torque to the socket member 17. In the position illustrated in the Figures 2 and 8, the adapter 10 may be used to either tighten or loosen the jaws 26 by turning the socket 17 in the clockwise or counter-clockwise direction.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A power transmission adapter to transmit driving power from a power wrench shaft to a rotatable tightening socket of a holding device, said adapter comprising a core member and a sleeve member, said core member having a plug portion and a body portion, said core plug portion having a polygonal cross-sectional configuration and being insertable in said socket to drive the socket, said body portion having a polygonal cross-sectional configuration of greater area than said plug portion, said adapter sleeve member having an opening therethrough, said sleeve being slidably mounted on said core body portion with the opening therethrough adapted to closely receive said core body portion, means to limit the extent of the sliding movement of the sleeve with respect to said core body portion, said sleeve opening and the end of the core body portion forming a wrench shaft receiving socket of polygonal configuration when said sleeve slidably extends with respect to said core, whereby the adapter may be placed with the said core plug portion in the rotatable tightening socket and the sleeve extended to form the said receiving socket and engage the wrench shaft in drive receiving relationship.

2. A power transmission adapter to transmit driving power from a power wrench shaft to a rotatable tightening socket of a holding device, said adapter comprising a core member and a sleeve member, said core member having a plug portion and a body portion, said core plug portion having a cross-sectional configuration adapted to be inserted in said socket to drive the socket, said body portion having a cross-sectional configuration of greater area than said plug portion, said adapter sleeve member having an opening therethrough, said sleeve being slidably mounted on said core body portion with the opening therethrough adapted to closely receive said core body portion, means to limit the extent of the sliding movement of the sleeve with respect to said core body portion, said sleeve opening and the end of the core body portion forming a wrench shaft receiving socket when said sleeve slidably extends with respect to said core, whereby the adapter may be placed with the said core plug portion in the rotatable tightening socket and the sleeve extended to form the said receiving socket and engage the wrench shaft in drive receiving relationship.

FLOYD E. NIEDERHISER.

REFERENCES CITED

The following references are of record in the file of this patent:

UNITED STATES PATENTS

| Number | Name | Date |
|---|---|---|
| 1,259,603 | Conord | Mar. 19, 1918 |
| 1,269,413 | Finnigan | June 11, 1918 |
| 1,823,426 | Ferris | Sept. 15, 1931 |
| 2,006,913 | Conley | July 2, 1935 |
| 2,249,240 | Groene et al. | July 15, 1941 |